R. E. HELLMUND.
SYSTEM OF CONTROL OF SINGLE PHASE COMMUTATOR GENERATORS.
APPLICATION FILED DEC. 8, 1917.

1,385,997.

Patented Aug. 2, 1921.

2 SHEETS—SHEET 1.

WITNESSES:
W. S. Reece
N. P. Coley

INVENTOR
Rudolf E. Hellmund.
BY
Wesley G. Carr
ATTORNEY

R. E. HELLMUND.
SYSTEM OF CONTROL OF SINGLE PHASE COMMUTATOR GENERATORS.
APPLICATION FILED DEC. 8, 1917.
1,385,997.
Patented Aug. 2, 1921.
2 SHEETS—SHEET 2.
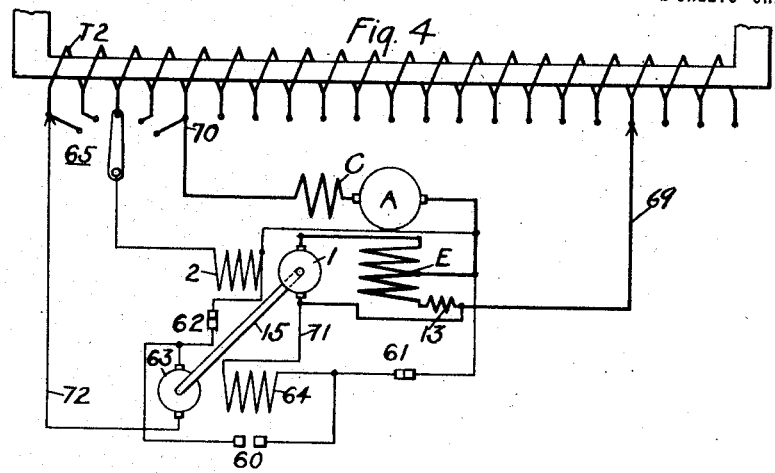
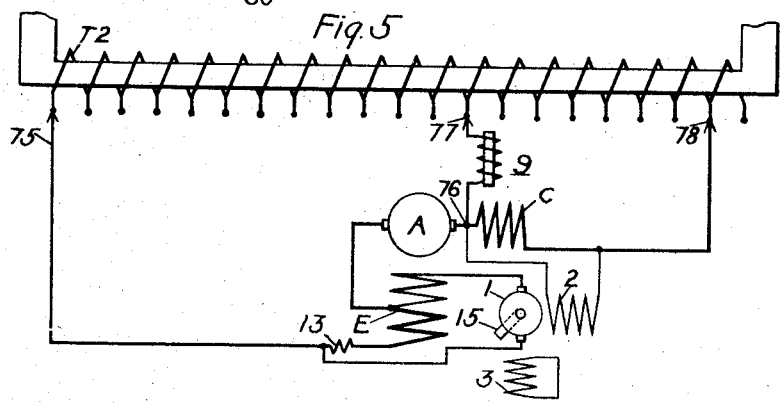
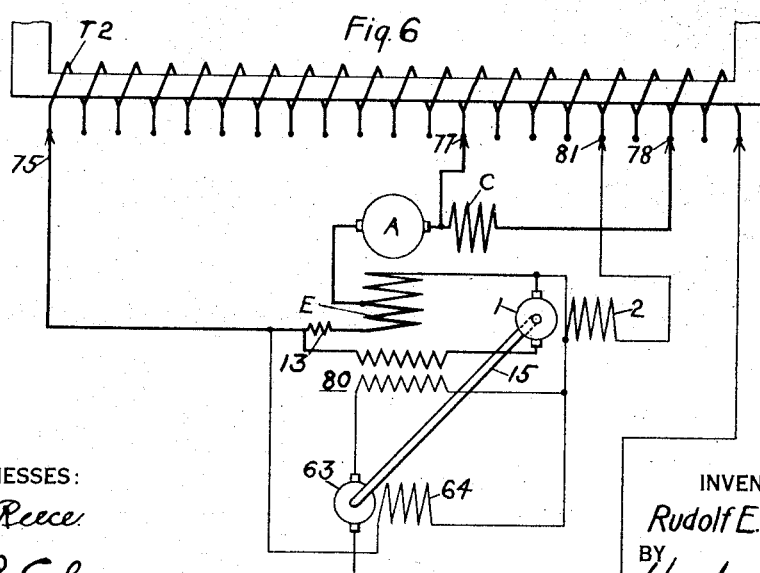
WITNESSES:
W. S. Reece
W. R. Coley
INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SYSTEM OF CONTROL OF SINGLE-PHASE COMMUTATOR-GENERATORS.

1,385,997.  Specification of Letters Patent.  Patented Aug. 2, 1921.

Application filed December 8, 1917. Serial No. 206,139.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Systems of Control of Single-Phase Commutator-Generators, of which the following is a specification.

My invention relates to systems of control for dynamo-electric machines and especially to means for governing motors of the single-phase commutator type under regenerative conditions.

One of the principal disadvantages in connection with regenerative control for single-phase commutator motors of the prior art has been the necessity for a relatively large and expensive exciting machine. The necessary size of the exciter may be reduced by utilizing the regenerated current for the major portion of the excitation and by causing the exciter to supply only the additional current that the exciting field winding of the main machine requires. In such a system, it is unavoidable, however, that the phase of the armature voltage should vary with the load, and it is, therefore, desirable to vary the voltage of the exciting field winding also in accordance with the load to obtain favorable working conditions throughout a wide operating range.

It is one object of my present invention to provide a system of the above-indicated character embodying automatic means for maintaining the difference between the total exciting current and the armature or regenerated current relatively small at all times whereby the size, cost and weight of the exciter may be desirably reduced.

Other minor objects of my invention will become evident from the following description and are set forth with particularity in the appended claims.

Figure 1:
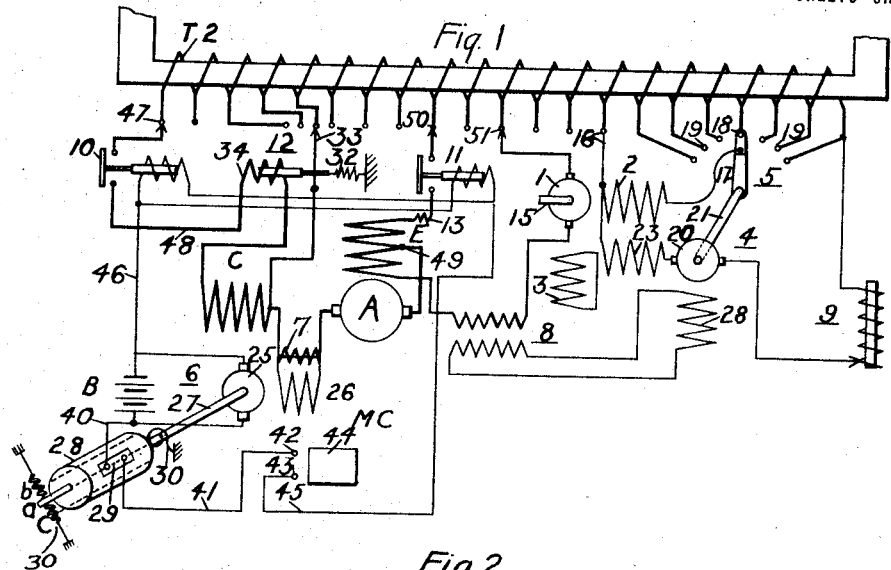

My invention may best be understood by reference to the accompanying drawings, wherein Figure 1 is a diagrammatic view of certain main and auxiliary circuits comprising a control system organized in accordance with the principles of the present invention; and Fig. 2 to Fig. 6, inclusive, are similar diagrammatic views of modified control systems also serving to illustrate my invention.

Referring to Fig. 1 of the drawings, the system shown comprises a suitable source of alternating-current energy, such as a secondary winding T2 of a suitable transformer; a single-phase transformer-conduction motor having a commutator-type armature A, an exciting field winding E, and an inducing or compensating field winding C having a materially larger number of turns than the armature A; an exciting machine having a commutator-type armature 1, an exciting field winding 2 and a short-circuited compensating winding 3; a torque-motor relay device 4 for actuating a switching device 5 to vary the excitation of the field winding 2 in accordance with certain circuit conditions to be set forth; a second torque-motor relay device 6 for automatically preventing the flow of heavy direct currents in the machine under emergency conditions, such as the interruption of supply-circuit voltage; a series transformer 8 that is utilized for energizing the torque-motor relay device 4, in a manner to be explained; a plurality of inductive devices 7 and 9; a plurality of switching devices 10, 11 and 12 for governing certain of the circuit connections through the agency of a master controller MC and an auxiliary source of energy, such as a battery B; and an auxiliary resistor 13, for a preventive purpose to be set forth.

The armature 1 of the exciter may be driven from any suitable auxiliary motor, as indicated by the shaft 15, and is connected, through the primary winding of the transformer 8, across the exciting field winding E of the main machine and a section of the main transformer winding T2. The exciting field winding 2 for the exciter machine is connected from an intermediate transformer tap-point by conductor 16 to a movable switch arm 17 of the switching device 5 having a contact tip 18 that is adapted to engage a plurality of control fingers or stationary contact members 19, which are respectively connected to various intermediate points of the transformer winding T2.

The torque-motor relay device 4 comprises a commutator-type armature 20, which may be secured to the switch arm 17 of the switching device 5 by a shaft 21, for example, an exciting field winding 22 being energized from the secondary winding of the series transformer 8, while a neutralizing field winding 23 is connected in series relation with the armature 20 and the inductive device 9, across a suitable section of the main transformer winding. The purpose of the inductive device 9 is to appropriately adjust the phase and magnitude of the voltage that is impressed upon the relay armature.

The torque-motor relay device 6 comprises a commutator-type armature 25 that is excited by direct current from the battery B, and an exciting field winding 26 that is energized from the inductive device 7, that is, in accordance with the current traversing the main armature A. The relay shaft 27 carries a small drum or cylinder 28, upon which is mounted an auxiliary-circuit contact segment 29 for a purpose to be set forth. The drum 28 is adapted to occupy a middle position $a$ to which it is biased by suitable spring members 30 and positions $b$ and $c$ on either side of the mid-position $a$, dependent upon the resultant torque action of the relay-device windings.

The switching devices 10 and 11 may be of any familiar electrically-controlled type and are illustrated to represent the necessary sets of voltage-varying switches that are normally employed to adjust the connections of the machine circuits to the various transformer taps, as will be understood.

The switching device 12 comprises a magnetizable core member 31 which is biased to the illustrated position by a suitable spring member 32 to effect a certain connection of a movable switch member 33 to the main transformer winding. The switch member 33 is included in the middle lead or conductor of the transformer-conduction machine, being connected to a point between the compensating field winding C and the main armature A.

An actuating coil 34 for the switching device is connected in series relation with the compensating field winding C of the main machine to actuate the switch arm 33 toward the left in opposition to the action of the spring 32, dependent upon the current traversing the compensating field winding, for a purpose to be subsequently explained.

Under regenerative operating conditions of the main machine, the master controller MC occupies an operative position whereby an auxiliary circuit is completed from the positive terminal of the battery B, through conductor 40, movable contact member 29 of the relay device 6, conductor 41, control fingers 42 and 43, which are bridged by contact segment 44 of the master controller, conductor 45, the parallel-related actuating coils for the switches 11 and 10, and conductor 46, to the negative terminal of the battery B.

A main circuit is thereupon established from the left-hand terminal 47 of the main transformer winding T2, through switch 10, conductor 48, actuating coil 34 for the switching device 12, compensating field winding C, the inductive device 7, main armature A, junction-point 49, where the circuit divides, the main branch traversing a portion of the exciting field winding E, preventive resistor 13 and switch 11 to an intermediate tap-point 50 of the main transformer, and the auxiliary branch traversing another portion of the exciting field winding E, the primary winding of the series transformer 8 and the armature 1 of the exciting machine to another intermediate transformer tap 51.

The purpose of the illustrated connection of the main armature and exciting field winding and of the preventive resistor 13 is fully set forth in my copending application, Serial No. 193,696, filed Sept. 28, 1917. Briefly stated, the connections shown serve to permit effective alternating-current regeneration while preventing the building-up of direct-current generation. The resistor 13 tends to balance the resistance of the exciting-field-winding circuits in such manner as to prevent the production of effective field flux under conditions of attempted direct-current operation.

By reason of the arrangement of branch circuits just recited, it follows that, whenever the main-armature or working-circuit current exceeds the current traversing the upper section of the exciting field winding E, the excess current flows in a certain direction through the excited armature 1 and the primary winding of the transformer 8, whereas, in case the main exciting-field-winding current is greater than the main-armature current, the reverse direction of current in the exciter armature takes place. Accordingly, the torque-motor relay device 4 will move in the one or the other direction to correspondingly actuate the movable arm 17 of the switching device 5 to compensatingly vary the voltage of the exciting field winding 2 for the exciter armature 1. For example, whenever the armature current is larger than the exciting field current of the main motor, the relay device 4 is adapted to actuate the switching device 5 toward the right to increase the voltage impressed upon the exciting field winding 2, thereby correspondingly increasing the exciter voltage, and, therefore, the current traversing the main exciting field winding E, to cause the armature and the exciting-field-winding currents of the main motor to become more nearly equal.

Such action of the relay device 4 will, of course, tend to increase the total regenerative torque, but the automatic operation of the switching device 12 will readjust the voltage of the entire main-motor circuit to reduce such torque to the desired normal value.

Thus, an increase of current in the main-motor circuit strengthens the actuating coil 34 of the switching device 12 to shift the movable contact member 33 toward the left and thus reduce the section of the main transformer winding that is connected across the compensating field winding C, thus increasing the total counter-electromotive force of the transformer across the armature terminals, so that the armature current and, consequently, the braking effect is diminished.

Under emergency conditions, such as the interruption of the alternating-current energy supplied to the main transformer winding, by reason of the passage of the railway vehicle underneath a "section break," for example, the momentum-driven main machine may tend to generate a heavy direct current by reason of the relatively low resistance value of the main-motor circuit, if the resistor 13 is not of proper value to compensate for the different heating effects and temperature co-efficients of the two branch circuits of the exciting field winding.

To prevent such undesirable action, the torque-motor relay device 6 may be provided, in addition to the above-mentioned balancing resistor 13 and the coöperating circuit connections. As long as the field winding 26 for the relay device 6 is excited by alternating current from the inductive device 7, the relay remains in its normal intermediate position $a$, by reason of the rapidity of reversal of the exciting current in the field winding; but, upon interruption of alternating-current energy and the subsequent direct-current energization of the relay field winding by the flow of regenerated direct current, the relay device is actuated by the spring 30 to shift the contact member 29 in the one or the other direction to interrupt the auxiliary circuit governing the switches 10 and 11. In this way, the main-motor-circuit switches will open to prevent more than a momentary flow of direct current.

In order to prevent the relay device 6 from unduly vibrating during alternating-current operation, a damping device or grid of well-known form is preferably located in the pole-faces to secure the familiar eddy-current damping action.

Figure 2:
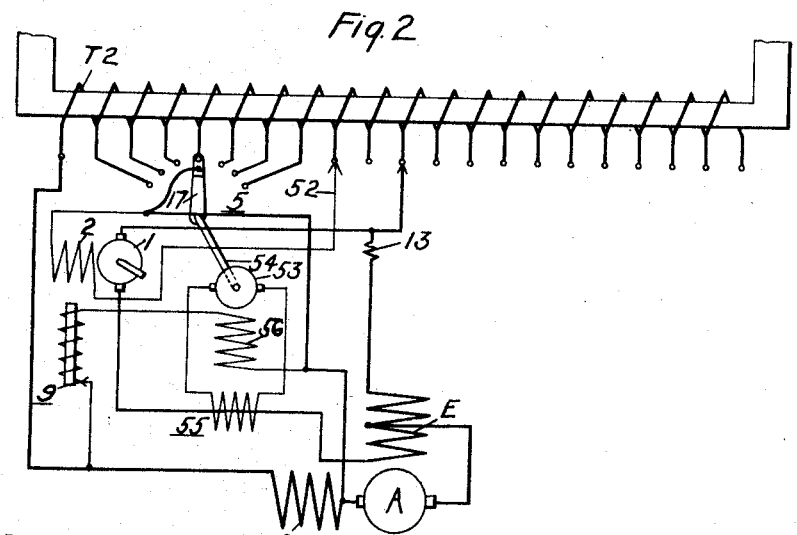

As pointed out in connection with Fig. 1, an increased excitation of the exciting field winding 2, for the purpose of adjusting the ratio of the main-armature to the main-exciting-field current, will also produce an increase of the regenerative torque unless the voltage impressed across the terminals of the machine is suitably varied. It is desirable to increase the equivalent voltage impressed upon the machine from the source at the same time that the exciting field current is increased. By "equivalent impressed" voltage I mean the sum of the voltage impressed upon the armature circuit, plus the voltage impressed upon the compensating-field-winding circuit times the transformer ratio between the turns of the armature and the compensating-field windings. A system for accomplishing the desired double function by a single switching device is illustrated in Fig. 2, wherein the main motor is connected to the transformer winding T2 in the previously described manner, while the exciter armature 1 is connected directly across the main exciting field winding E, and the exciting field winding 2 for the exciter is connected between an intermediate voltage tap 52 of the main transformer and the switching device 5, which is now located in the left-hand section of the main transformer winding.

A torque-motor relay device 53 has its shaft 54 secured to the movable arm 17 of the switching device 5, the armature being connected to the secondary winding of a transformer 55 that is energized in accordance with the current traversing the exciter armature 1. An exciting field winding 56 for the relay device is connected, through the phase-adjusting inductive device 9, across a section of the working-circuit, in this case the compensating field winding C of the main machine.

Whenever, by reason of the resultant action of its component windings, the illustrated relay device is actuated to increase the voltage impressed upon the exciting field winding 2, which corresponds to a movement of the switch arm 17 toward the left, the total equivalent voltage impressed upon the machine from the source is also increased by such action, since the ratio of the number of turns in the compensating field winding C to the number of turns in the armature A is greater than unity, as previously mentioned. By a suitable design of the number of turns in the armature windings and a judicious selection of the transformer voltage, a system may be obtained whereby the above-described actuation of the switching device 5 will increase the current traversing the main exciting field winding E by reason of the increase in the auxiliary field winding 2, and thus an increase of the main-armature current is prevented by the resultant rise in the equivalent impressed main-machine voltage. It is even possible to so design the coöperating windings that the armature current will actually decrease under such conditions, so that the movement of the switching device 5 merely changes the two currents in question in such manner that an increase of the one is counterbalanced by an equivalent decrease of the other, thus leaving the resultant regenerative torque unchanged. Such torque may be regulated at any time by shifting the tap-conductor 52, either manually or automatically, in any suitable manner.

Figure 3:
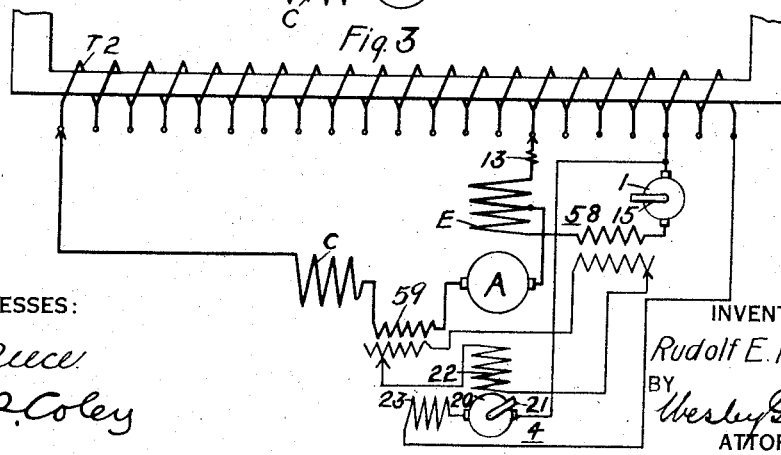

In certain cases, it may not be desirable to maintain the armature and exciting field current of the main machine substantially equal, but rather to preserve a certain ratio between the two currents. Such action may be accomplished by the system that is shown in Fig. 3, wherein the arrangements of the main machine, of the exciter and of the relay device 4 are similar to those shown in Fig. 1, while a plurality of transformers 58 and 59, which have their primary windings respectively energized in accordance with the current traversing the exciting field winding E and the armature A, have their variable secondary windings opposingly connected to energize the exciting field winding 22 for the relay device 4, in accordance with the inductive difference of such secondary-winding currents. In this way, any desired ratio of the currents traversing the main armature A and the exciting field winding E may be automatically maintained by the use of the switching device 5, in the manner already set forth in connection with Fig. 1.

In order to vary the voltage of the field excitation in accordance with the load, to obtain favorable working conditions throughout a wide operating range, it is desirable to have the exciting field voltage at all times approximately in time quadrature relation to the armature voltage of the main machine. Such results may be obtained by the system that is shown in Fig. 4, for example, wherein is shown the transformer winding T2; the main motor having armature A, exciting field winding E and compensating or inducing field winding C; an exciter having an armature 1 connected across the exciting field winding E, and an exciting field winding 2 connected through the main armature A, compensating field winding C and a variable switching device 65 to a section of the main transformer winding.

An auxiliary driving motor armature 63 is mounted upon the exciter shaft 15 and is energized from the main transformer winding and the main machine in a manner to be set forth. An exciting field winding 64 for the auxiliary driving motor is connected in different circuits, under starting and normal running conditions, as about to be described. A plurality of switches 60, 61 and 62 are diagrammatically shown to emphasize the particularly novel features of the present system, but it will be understood that the usual full complement of switches will be employed in actual practice, although omitted here for the sake of simplicity and clearness.

By initially closing the switch 60, a main circuit is established from an intermediate transformer-tap-conductor 70, through compensating field winding C, main armature A, the lower section of the main exciting field winding E and resistor 13 to end-tap 69. An auxiliary circuit is established from that tap through conductor 71, field winding 64 for the auxiliary driving motor, switch 60, armature 63 of the auxiliary driving motor and conductor 72, to the left-hand terminal of the main transformer winding. The main machine and the auxiliary driving motor are thus both connected as straight series motors across a suitable section of the transformer. Under running conditions, the switches 61 and 62 are closed and the switch 60 is opened, whereby the armature 63 of the auxiliary motor is connected across the main armature and compensating field winding and a section of the transformer, while its field winding 64 is connected directly across the lower portion of the main exciting field winding E.

By reason of the illustrated arrangement of circuits and, in particular, the connection of the field winding 2 across the main armature circuit, there is an inherent tendency to maintain a fixed ratio between the main armature and field currents, as desirable for reasons previously explained. Since the winding 2 is connected across the main-armature circuit, the output voltage of the armature 1 and, consequently, the voltage of field E, will be about at right angles to the armature voltage. Since the field voltage and the armature voltage thus combine at right angles to give the constant voltage between terminals 70 and 69, any increase in the field voltage and the consequent increase of field current must bring about a decrease of the armature voltage. Such a decrease will, therefore, cause a decrease in the excitation of the field winding 2 and thus in the voltage of armature 1 and the main field winding E, thereby counteracting the initial increase of the field current. Under certain conditions, it may be advisable, in order to compensate for voltage drops caused by load conditions, to vary the section of the main transformer winding that is connected in circuit with the exciting field winding 2. Such action may readily be accomplished by the switching device 65 to either increase or decrease the voltage impressed upon the field winding 2 in accordance with the direction of movement of the switching device.

Instead of connecting the exciting field winding 2 for the exciter machine across the armature circuit, as illustrated in Fig. 4, it may be connected in shunt to other working circuits, as, for instance, the inducing field winding, in an indirectly-fed or repulsion-type of motor. As another instance, the field winding 2 may be connected to the secondary winding of an auxiliary transformer, the primary winding of which is energized in accordance with the main-armature voltage.

In Fig. 5, the field winding 2 is shown as connected across the inducing field winding of a doubly-fed or transformer-conduction motor with the inductive device 9 introduced in the middle lead or conductor for the purpose of simultaneously adjusting the phase relations of both the inducing field winding C and of the auxiliary field winding 2.

The main circuits may be traced as follows: from the left-hand terminal of the transformer winding T2 through conductor 75, preventive resistor 13, the lower section of the exciting field winding E, main armature A, junction-point 76, inductive device 9 and middle tap-point 77; also from the right-hand tap-point 78 through compensating field winding C to junction-point 76, whence circuit is completed through the middle conductor to tap-point 77.

In Fig. 6, the field winding 2 is connected across both the armature and the compensating field winding of a transformer-conduction motor, a small portion of the transformer winding T2 being negatively connected in circuit, so that the energizing circuit for the auxiliary field winding 2 is established from the transformer tap-point 78 near the right-hand terminal of the transformer winding T2, through compensating field winding C, the main armature winding A, the upper section of the exciting field winding E, and the auxiliary field winding 2 to a second transformer tap-point 81 that is located to the left of the previously-mentioned transformer tap-point 78. The main armature circuit proper is established from the middle tap-point 77 through the armature A, the lower section of the main exciting field winding E and preventive resistor 13 to the terminal tap-conductor 75.

The system illustrated in Fig. 6 may be described as self-compounding, since it tends to automatically maintain a relatively low current in the exciter armature 1. This result is accomplished by influencing the voltage of the auxiliary driving armature 63 in accordance with the current in the exciter armature 1 by reason of the interposition of the secondary winding of a transformer 80 in circuit with the auxiliary driving motor armature 63, the primary winding of the transformer 80 being connected in series relation with the exciter armature 1. Assuming, for example, that the regenerated current in the main armature A is temporarily considerably smaller than the current simultaneously traversing the exciting field winding E, the exciter armature 1 is called upon to supply an appreciable value of current. Under such conditions, the series transformer 80 will act to inductively increase the voltage impressed upon the auxiliary driving armature 63 to increase the operating speed thereof, and, therefore, primarily, the voltage of the exciter armature 1 and, secondarily, of the main-exciting-field winding E. In this way, the main-armature or regenerative current is increased, and, consequently, the necessary current to be furnished by the exciter 1 is correspondingly diminished.

It will be understood that the illustrated direct connection between the relay device 4 and the switching device 5, for example, is provided to set forth the principles of my invention in a simple manner, whereas, in actual practice, a suitable step-by-step controller, governed by the relay device, would be employed to vary the circuit connections.

I do not wish to be restricted to the specific circuit connections or arrangement of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with an alternating-current dynamo-electric machine having an armature and an exciting field winding, of means including a source of energy for supplying to said field winding the difference between the armature and the field-winding currents, and means for automatically adjusting such differential current.

2. In a system of control, the combination with a main alternating-current dynamo-electric machine having an armature and an exciting field winding, of means comprising an exciting armature for supplying to said field winding the difference between the main-armature and the field-winding currents, and means for automatically modifying such differential current.

3. In a system of control, the combination with a single-phase commutator motor having an armature and an exciting field winding, of means comprising a generator for supplying to said field winding the difference between the main-armature and the field-winding currents, and means dependent upon the relative variation of such currents for automatically maintaining a relatively low difference thereof.

4. In a system of control, the combination with a single-phase commutator motor having an armature and an exciting field winding, of means including a generator for supplying to said field winding the difference between the main-armature and the field-winding currents, and means comprising a torque relay device having its component elements respectively energized in accordance with such differential current and with a fixed voltage for automatically maintaining a relatively low value of said current-difference.

5. In a system of control, the combination with a supply transformer winding and a single-phase commutator motor having an armature and an exciting field winding, of means including a generator for supplying to said field winding the difference between the main-armature and the field-winding currents, and means comprising a torque-motor relay device having its coöperating windings respectively energized in accordance with such differential current and with a fixed voltage from said transformer winding for automatically varying the excitation of said generator.

6. In a system of control, the combination with a transformer winding, and a single-phase commutator motor having an armature and an exciting field winding, of means including a generator for supplying to said field winding the difference between the main-armature and the field-winding currents, and means comprising a torque-motor relay device having an armature connected across a portion of said transformer winding and having a field winding energized in accordance with the generator current for automatically adjusting the excitation of the generator.

7. In a system of regenerative control, the combination with an alternating-current dynamo-electric machine having an armature and an exciting field winding, of means including a source of energy for supplying to said field winding the difference between the armature and the field-winding currents, means for automatically adjusting such differential current, and means for automatically readjusting the machine connections to maintain a substantially constant regenerative torque.

8. In a system of regenerative control, the combination with a single-phase commutator motor having an armature and an exciting field winding, of means comprising a generator for supplying to said field winding the difference between the main-armature and the field-winding currents, means dependent upon the relative variation of such currents for automatically maintaining a relatively low difference thereof, and means for automatically readjusting the motor connections to maintain a substantially constant regenerative torque.

9. In a system of regenerative control, the combination with a transformer winding, and a single-phase commutator motor having an armature and an exciting field winding, of means including a generator for supplying to said field winding the difference between the main-armature and the field-winding currents, means comprising a torque-motor relay device having an armature connected across a portion of said transformer winding and having a field winding energized in accordance with the generator current for automatically adjusting the excitation of the generator, and means for automatically varying the connections of said transformer winding to the motor to maintain a substantially constant regenerative torque.

10. In a system of control, the combination with a single-phase commutator motor having an armature and an exciting field winding, of means including a generator for supplying to said field winding the difference between the main-armature and the field-winding currents, and means for automatically interrupting the motor circuit upon a momentary flow of direct current therein.

11. In a system of control, the combination with a single-phase commutator motor having an armature and an exciting field winding, of means including a generator for supplying to said field winding the difference between the main-armature and the field-winding currents, an auxiliary source of direct-current energy, and means comprising a torque-motor relay device having its component windings respectively energized from said source and in accordance with the main-machine current for interrupting the motor circuit upon a momentary flow of direct-current through the motor.

12. In a system of control, the combination with an alternating-current commutator motor having an armature and an exciting field winding in series relation therewith, of an exciter for said field winding, and automatic means responsive to differences of phase between the load current and the field excitation for maintaining predetermined circuit relations.

13. In a system of control, the combination with an alternating-current commutator motor having an armature and an exciting field winding, of an exciter for said field winding, automatic means responsive to differences of phase between the load current and the field excitation for maintaining predetermined circuit relations, and means for automatically varying the equivalent impressed voltage.

In testimony whereof, I have hereunto subscribed my name this 28th day of Nov., 1917.

RUDOLF E. HELLMUND.